United States Patent
Crawmer

(10) Patent No.: US 6,454,531 B1
(45) Date of Patent: Sep. 24, 2002

(54) FABRICATING TURBINE ROTORS COMPOSED OF SEPARATE COMPONENTS

(75) Inventor: Gerald Richard Crawmer, Saratoga, NY (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 09/748,150

(22) Filed: Dec. 27, 2000

(51) Int. Cl.$^7$ ................................................. F01D 1/02
(52) U.S. Cl. ............................. 415/198 R; 416/201 R; 228/175
(58) Field of Search .................. 29/889.21; 228/112.1, 228/113, 114, 114.5, 175; 415/198 R, 200, 216.1; 416/201 R, 215 R, 241 R, 244 R, 244 A, 241 B

(56) References Cited

U.S. PATENT DOCUMENTS

| | | | |
|---|---|---|---|
| 3,067,490 A | * | 12/1962 | Luthy et al. ............. 219/137 R |
| 4,213,025 A | * | 7/1980 | Kuhnen .................. 219/124.33 |
| 4,743,165 A | * | 5/1988 | Ulrich ........................ 219/118 |
| 4,962,586 A | | 10/1990 | Clark et al. |
| 5,172,475 A | | 12/1992 | Amos et al. |
| 5,414,929 A | | 5/1995 | Floser et al. |
| 5,487,082 A | | 1/1996 | Takenouchi et al. |
| 5,532,454 A | | 7/1996 | Kuhnen |
| 6,324,831 B1 | * | 12/2001 | Izadi et al. .............. 29/889.21 |

OTHER PUBLICATIONS

Web site interfacewelding.com, "Interface Welding; Specialists in Inertia Welding"; admitted prior art.
Web site ifweld.com/brochure/inertia.htm; "Inertia Friction Welding, Inc., Inertia Friction Method"; admitted prior art.

* cited by examiner

Primary Examiner—Edward K. Look
Assistant Examiner—Igor Kershteyn
(74) Attorney, Agent, or Firm—Nixon & Vanderhye P.C.

(57) ABSTRACT

A steam turbine rotor is constructed from a first forging of a first alloy, and a second forging of a second alloy different than the first alloy. For example, one of the alloys is suitable for use in a high temperature environment and the other in a low temperature environment. The forging ends are contoured so as to provide central portions, which may be disc-shaped, and the contoured portions may be in the shape of truncated cones. A first weld, such as a root weld formed by inertia, friction, or electroslag welding, joins the central portions, and the contoured portions are joined by a second weld different than the first weld, such as a submerged arc weld. This allows the rotor forgings to be joined in relatively inexpensive horizontal facilities, and reduces the demands on the welding technology required to obtain a sound root weld.

24 Claims, 1 Drawing Sheet

FABRICATING TURBINE ROTORS COMPOSED OF SEPARATE COMPONENTS

BACKGROUND OF THE INVENTION

Many steam turbine rotors are fabricated by welding two or more separate forgings together since forgings of some alloys are much better suited to high temperature environments, while forgings of other alloys are best suited for lower temperature environments, and the steam turbine rotor typically has to traverse both high temperature and low temperature environments. Typical techniques for joining such forgings together are disclosed in U.S. pat. Nos. 4,962,586, 5,414,929, and 5,532,454, the disclosures of which are hereby incorporated by reference. In one technique, the forgings are provided with a central, axial cavity or hole at a planned site of a circumferential weld to reduce the depth of the required weld to the minimum necessary for adequate strength. That is, the weld cross section is typically an annulus when viewed axially down a rotor. For some rotor designs, such as impulse turbine designs, the required strength of the minimal depth weld joint thus produced might require an increase in rotor diameter at the welded site, which can be undesirable due to increased annulus area of the packings or steam seals associated with the turbine rotor in use. Additionally, this type of fabrication requires specialized and expensive welding stations capable of handling a rotor vertically, and to carefully make root welds, which can remain in the as-welded final configuration. If less expensive welding stations for horizontally positioned rotors are utilized, they may produce weld root cracking caused by alternating deflections as the material is rotated.

BRIEF SUMMARY OF THE INVENTION

According to the present invention, a steam turbine rotor is provided, and a method of manufacture thereof, which are advantageous compared to typical techniques. According to the present invention it is possible to provide a weld substantially through the entire, or at least a majority of, the rotor cross section rather than providing a relatively small annular weld. However, if such a weld were attempted utilizing conventional processes to produce a single weld, a large deep weld would be required which would be time consuming and difficult to produce. However, that can be avoided, according to the present invention, by providing two different welds, produced by different processes that are suitable for the particular welds involved, and which has a number of advantageous attributes and results. For example, a root weld may be provided which is less than optimum. but allows the rotor forgings to be held together for conventional welding in relatively inexpensive horizontal facilities so that an optimum weld may be produced that does not require a significant bulge at the weld, which would cause an undesirable increases in the annulus areas of packings or steam seals.

According to one aspect of the present invention there is provided a steam turbine rotor comprising: A first steam turbine rotor forging of a first alloy, having a first end and a first diameter. A second steam turbine rotor forging of a second alloy significantly different than the first alloy having a second end and a second diameter. The first and second ends contoured so as to provide first and second central portions. respectively, having third and fourth diameters, respectively, less than the first and second diameters, and first and second contoured portions, respectively, radially outward of the first and second central portions, respectively.

The first and second central portions joined by a first weld comprising a friction, inertia, or electroslag weld. And the first and second contoured portions joined by a second weld comprising an arc weld. The first weld need not be normalized or heat tempered because it need not provide strength for the final weld holding the forgings together.

The arc weld may comprise a submerged arc weld. The contoured portions may comprise truncated cones, and the central portions may be disc-shaped truncations of the contoured portions. The central portions may have a diameter of about 20–30% of the diameter of the rotors; for example, the central portions may have a diameter of about 8 inches, whereas the rotor diameter may be 32 inches.

The first alloy may be a CrMo alloy, such as a CrMoV alloy, while the second alloy may be an NiCrMo alloy, such as an NiCrMoV alloy. Preferably the first and second diameters are substantially the same, and the third and fourth diameters are substantially the same.

According to another aspect of the present invention there is provided a method of making a steam turbine rotor from first and second steam turbine rotor forgings of different alloys having first and second ends, respectively, comprising: a) Forming the first and second ends so that each comprises a central portion, and a contoured portion extending axially and radially outwardly from the central portion. b) Bringing the central portions of the different alloy first and second steam turbine rotor forgings into aligned operative association with each other. c) While the central portions are in aligned operative association with each other, welding the central portions of the first and second rotor forgings together using a first welding technique so that the first and second rotor forgings stay together and aligned during subsequent handling. And d) after c), welding the contoured portions of the first and second rotor forgings together while positioned substantially horizontally using a second welding technique, different than the first technique, to form an operable composite steam turbine rotor.

For example, c) may be practiced by friction, inertia, or electroslag welding, and b) may be practiced by arc welding, such as submerged arc welding. Desirably, the central portions of the first and second rotor forgings are substantially disc-shaped and have substantially the same diameter, and b) is practiced to place the central portions in face-to-face aligned position. Also, typically the contoured portions are substantially truncated cone-shaped portions of substantially the same diameter and conic angle, and define an open volume between them, and preferably d) is practiced to substantially fill the open volume by arc welding. Desirably d) is practiced after c) without any intervening procedures for normalizing or heat treating the weld formed by c).

The method also typically further comprises using the turbine rotor so created so that the first rotor forging is disposed within a high temperature area, and the second rotor forging is disposed within a low temperature area, in a steam turbine environment.

According to yet another aspect of the present invention there is provided a steam turbine rotor comprising: A first steam turbine rotor forging of a first alloy, having a first end and a first diameter. A second steam turbine rotor forging of a second alloy significantly different than the first alloy having a second end and a second diameter. The first and second ends contoured so as to provide first and second central portions, respectively, having third and fourth diameters, respectively, less than the first and second diameters, and first and second contoured portions, respectively, radially outward of the first and second central portions, respectively. The contoured portions comprising truncated cones and the central portions comprise disc shaped truncations of the conical contoured portions, and have a diameter about 20–30% of the diameter of the rotors. And a first weld joining the first and second central portions, and a second weld, different than the first weld, joining the first and second contoured portions.

Preferably the first and second diameters are substantially the same, and the third and fourth diameters are substantially the same. The first weld need not be normalized or heat treated. The first alloy may be a CrMoV alloy, and the second alloy may be an NiCrMoV alloy. Also desirably the steam turbine rotor is mounted for rotation, and one of the rotor forgings disposed in a high temperature area, and the other of the rotor forgings disposed in a low temperature area, in a steam turbine environment.

DETAILED DESCRIPTION OF THE INVENTION

Figure 1:
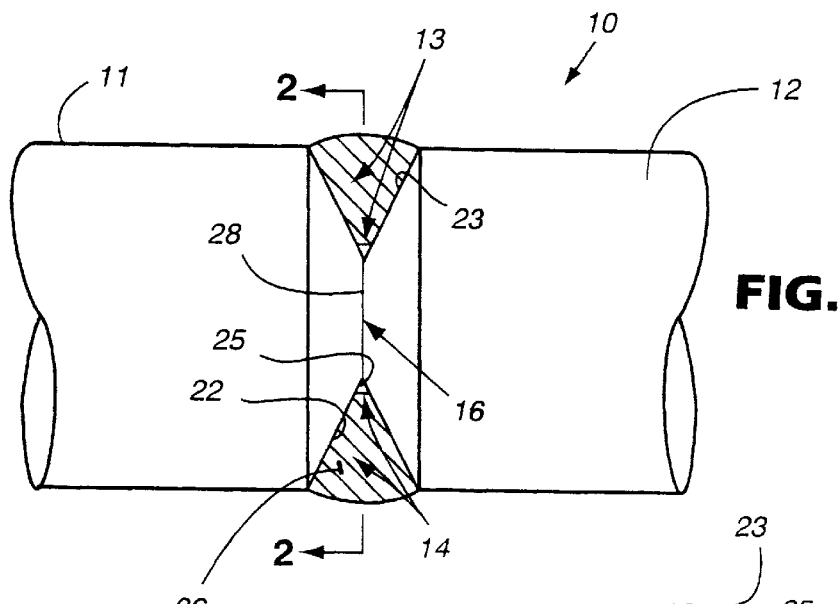
FIG. 1 is a side schematic view of two different steam turbine rotor forgings welded together to form a steam turbine rotor according to the present invention.

FIG. 1 schematically illustrates a steam turbine rotor 10 according to the present invention at a portion thereof where two different alloy forgings are welded together. The rotor 10 comprises a first steam turbine rotor forging 11 of a first alloy, such as CrMoV, and a second steam turbine rotor forging 12 of a second alloy, such as NiCrMoV. Typically the alloy of one of the forgings 11, 12 is a especially suited for high temperature areas, while the other is especially suited for low temperature areas. The first rotor forging 11 has a first end shown generally by reference numeral 13, while the second rotor forging has a second end shown generally by reference numeral 14. Each of the forgings 11, 12, has a diameter, the first diameter of the first forging 11 being shown between the arrows 15 in FIGS. 3 and 4.

Figure 2:
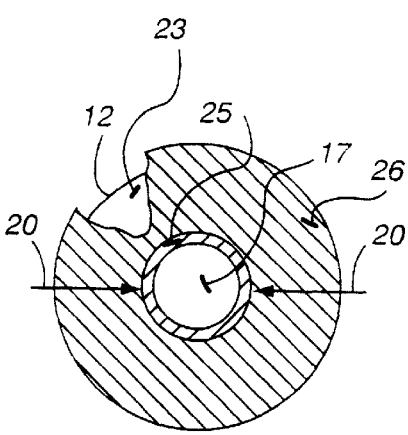
FIG. 2 is a cross-sectional view taken along lines 2—2 of FIG. 1 and with a part of the weld cut away for clarity of illustration of the forging behind the weld.
Figure 3:
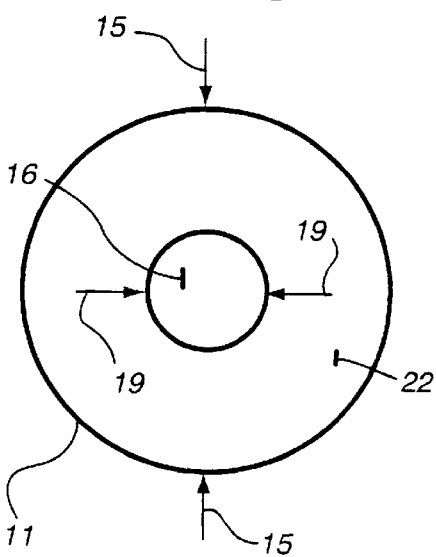
FIG. 3 is a front end view of one of the forgings of FIG. 1 before welding.
Figure 4:
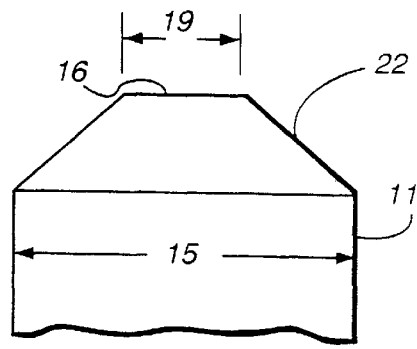
FIG. 4 is a detailed side view of the forging of FIG. 3.

The first and second ends 13, 14 are contoured so as to provide first and second central portions, a first central portion being shown by reference numeral 16 in FIGS. 1, 3, and 4, while the second central portion is shown by reference numeral 17 in FIG. 2. The central portions 16, 17 also have a diameter, the central portion 16 third diameter is shown between the arrows 19 in FIGS. 3 and 4, and the second forging central portion 17 having a fourth diameter shown between the arrows 20 in FIG. 2. In the preferred embodiment illustrated in the drawings, the diameters of the forgings 1 1, 12 are the same, as are the diameters 19, 20 of the central portions 16, 17.

As seen in the drawings, the central portions 16, 17 preferably have the shape of truncated contoured portions, that is are substantially disc-shaped. The rotor 10 also has contoured portions associated with each of the ends 13, 14 of the forgings 11, 12, the contoured portions extending radially outward of, and axially from, forgings 11, 12. While the contoured portions may have other shapes, preferably they are in the form of truncated cones, such as shown by reference numeral 22 in FIGS. 1, 3, and 4 for the forging 11, and shown by reference numeral 23 in FIGS. 1 and 2.

According to the present invention, a first weld 25 is provided joining the central portions 16, 17 together. The first weld 25 comprises a root weld, that need not be normalized, heat tempered, or otherwise treated so as to maximize its strength because it does not provide the main joining function between the forgings 11, 12 and may be formed, for example, by friction, inertia, or electroslag welding. The first weld 25 must hold the forgings 11, 12 together sufficiently for subsequent handling, such as in conventional horizontal welding facilities, in which the second weld 26 is produced. The second weld 26 provides the main weld for providing sufficient strength to hold the forgings 11, 12 together in positive alignment during use of the rotor 10. The second weld 26 is preferably formed by arc welding, such as submerged arc welding.

In the preferred embodiment illustrated in the drawings, the diameter 19 of the central portion 16 is typically between about 20–30% of the diameter 15 of the forging 11; and a similar ratio exists for the central portion 17 of the second forging 12. For example, the diameter 19 may be 8 inches, while the diameter 15 is 32 inches. the second (submerged arc) weld 26 thus having a maximum depth of about 12 inches.

In a particularly desirable method according to the present invention for forming a steam turbine rotor 10 from forgings 11, 12 of different alloys, there is provided: (a) Forming the first and second ends 13, 14 so that each comprises a central portion 16, 17, respectively, in a contoured portion 22, 23 extending axially and radially outward from the central portion 16, 17. (b) Bringing the central portions 16, 17 into aligned cooperative association with each other (such as in directly aligned abutment). (c) While the central portions 16, 17 are in aligned cooperative association with each other, welding the central portions together using a first welding technique (such as friction, inertia, or electroslag welding) to provide a root weld 25 so that the forgings 11, 12 stay together and aligned during subsequent handling. And (d), after (c) welding the contoured portions 22, 23 while positioned substantially horizontally (in a conventional relatively inexpensive horizontal facility) using a second welding technique, different than the first technique (such as submerged arc welding), to form an operable composite steam turbine rotor. Ultimately, the rotor 10 is used so that one of the forgings 11, 12 is disposed within a high temperature area, and the other forging 11, 12 is disposed within a low temperature area, both in a steam turbine environment.

In the practice of the invention, it should be understood that where a friction or inertia weld is provided, it may not be visible in the drawings, but simply would be at the join line between the forgings 11, 12, such as the line 28 illustrated in FIG. 1. Where electroslag welding is utilized, the weld 25 may be visible, as seen in FIGS. 1 and 2. Normally an electroslag weld needs to be fully normalized or tempered, such as subjected to heat treatment, however since the first weld 25 primarily merely serves to hold the forgings 11, 12 together for subsequent horizontal welding and to provide a root back up for the outer circumferential weld 26, normalizing, or tempering, or otherwise treating, the first weld 25 is not typically necessary.

It will thus be seen that according to the present invention an advantageous steam turbine rotor having forgings of different alloys has been provided, as well as a relatively simple and inexpensive, yet effective, method of manufacture thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A steam turbine rotor comprising:

a first steam turbine rotor forging of a first alloy, having a first end and a first diameter;

a second steam turbine rotor forging of a second alloy significantly different than said first alloy having a second end and a second diameter;

said first and second ends contoured so as to provide first and second central portions, respectively, having third and fourth diameters, respectively, less than said first and second diameters, and first and second contoured portions, respectively, radially outward of said first and second central portions, respectively;

said first and second central portions joined by a first weld comprising a friction, inertia, or electroslag weld; and said first and second contoured portions joined by a second weld comprising an arc weld.

2. A steam turbine rotor as recited in claim 1 wherein said arc weld comprises a submerged arc weld.

3. A steam turbine rotor as recited in claim 1 wherein said first alloy is a CrMo alloy, and wherein said second alloy is an NiCrMo alloy.

4. A steam turbine rotor as recited in claim 1 wherein said contoured portions are truncated cones.

5. A steam turbine rotor as recited in claim 4 wherein said central portions have a diameter about 20–30% of the diameter of said rotor forgings.

6. A steam turbine rotor as recited in claim 5 wherein said first and second diameters are substantially the same, and said third and fourth diameters are substantially the same.

7. A steam turbine rotor as recited in claim 6 wherein said first weld is not normalized or heat tempered.

8. A steam turbine rotor as recited in claim 6 wherein said first alloy is a CrMoV alloy, and wherein said second alloy is an NiCrMoV alloy.

9. A steam turbine rotor as recited in claim 5 wherein said central portions are disc shaped truncations of said conical contoured portions.

10. A steam turbine rotor as recited in claim 9 wherein said arc weld comprises a submerged arc weld.

11. A method of making a steam turbine rotor from first and second steam turbine rotor forgings of different alloys having first and second ends, respectively, comprising:

a) forming the first and second ends so that each comprises a central portion, and a contoured portion extending axially and radially outwardly from the central portion;

b) bringing the central portions of the different alloy first and second steam turbine rotor forgings into aligned operative association with each other;

c) while the central portions are in aligned operative association with each other, welding the central portions of the first and second rotor forgings together using a first welding technique so that the first and second rotor forgings stay together and aligned during subsequent handling; and d) after c), welding the contoured portions of the first and second rotor forgings together while positioned substantially horizontally using a second welding technique, different than the first technique, to form an operable composite steam turbine rotor.

12. A method as recited in claim 11 wherein c) is practiced by friction, inertia, or electroslag welding.

13. A method as recited in claim 12 wherein d) is practiced by arc welding.

14. A method as recited in claim 11 wherein d) is practiced by submerged arc welding.

15. A method as recited in claim 11 wherein the central portions of the first and second rotor forgings are substantially disc-shaped and have substantially the same diameter, and wherein b) is practiced to place the central portions in face-to-face aligned position.

16. A method as recited in claim 15 wherein the contoured portions are substantially truncated cone-shaped portions and of substantially the same diameter and conic angle, and define an open volume therebetween; and wherein d) is practiced to substantially fill the open volume by arc welding.

17. A method as recited in claim 11 wherein d) is practiced after c) without any intervening procedures for normalizing or heat treating the weld formed by c).

18. A method as recited in claim 13 wherein d) is practiced after c) without any intervening procedures for normalizing or heat treating the weld formed by c).

19. A method as recited in claim 11 further comprising using the turbine rotor so created so that the first rotor forging is disposed within a high temperature area, and the second rotor forging is disposed within a low temperature area, in a steam turbine environment.

20. A steam turbine rotor comprising:

a first steam turbine rotor forging of a first alloy, having a first end and a first diameter;

a second steam turbine rotor forging of a second alloy significantly different than said first alloy having a second end and a second diameter;

said first and second ends contoured so as to provide first and second central portions, respectively, having third and fourth diameters, respectively, less than said first and second diameters, and first and second contoured portions, respectively, radially outward of said first and second central portions, respectively;

said contoured portions comprising truncated cones and said central portions comprise disc shaped truncations of said conical contoured portions, and have a diameter about 20–30% of the diameter of said rotors; and a first weld joining said first and second central portions, and a second weld, different than said first weld, joining said first and second contoured portions.

21. A steam turbine rotor as recited in claim 20 wherein said first and second diameters are substantially the same, and said third and fourth diameters are substantially the same.

22. A steam turbine rotor as recited in claim 20 wherein said first weld is not normalized or heat tempered.

23. A steam turbine rotor as recited in claim 20 said first alloy is a CrMoV alloy, and wherein said second alloy is an NiCrMoV alloy.

24. A steam turbine rotor as recited in claim 20 mounted for rotation, and wherein one of said rotor forgings disposed in a high temperature area, and the other of said rotor forgings disposed in a low temperature area, in a steam turbine environment.

* * * * *

UNITED STATES PATENT AND TRADEMARK OFFICE
CERTIFICATE OF CORRECTION

PATENT NO. : 6,454,531 B1
DATED : September 24, 2002
INVENTOR(S) : Crawmer

It is certified that error appears in the above-identified patent and that said Letters Patent is hereby corrected as shown below:

Column 1,
Line 3, after the title, insert the following sentence:
-- This invention relates to turbomachinery and specifically, to the manufacture of turbine rotors. --

Signed and Sealed this

Seventeenth Day of December, 2002

JAMES E. ROGAN
*Director of the United States Patent and Trademark Office*